United States Patent Office 3,436,467
Patented Apr. 1, 1969

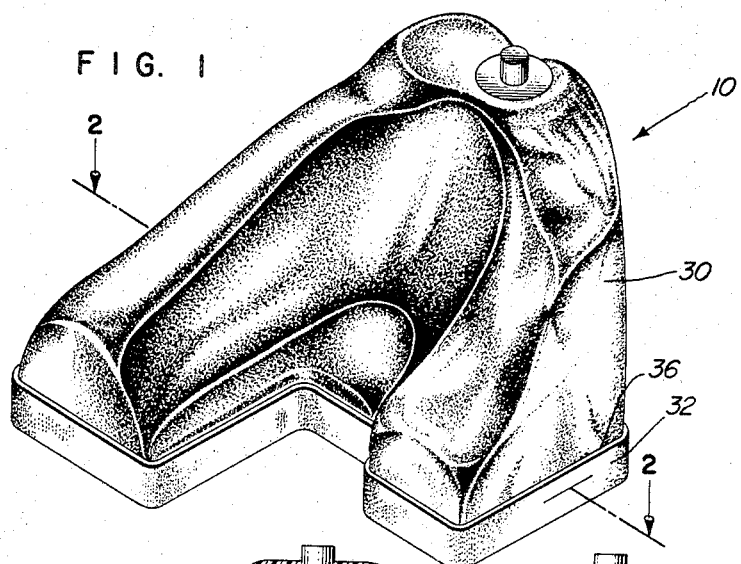
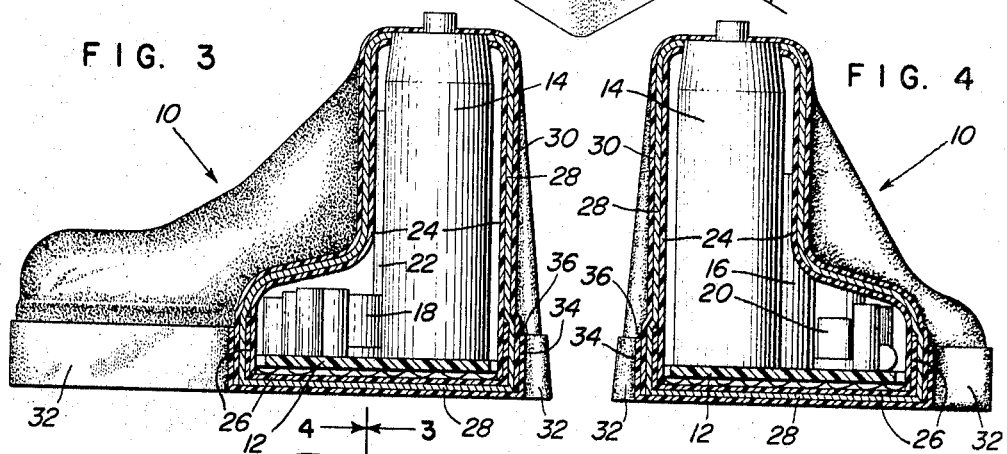
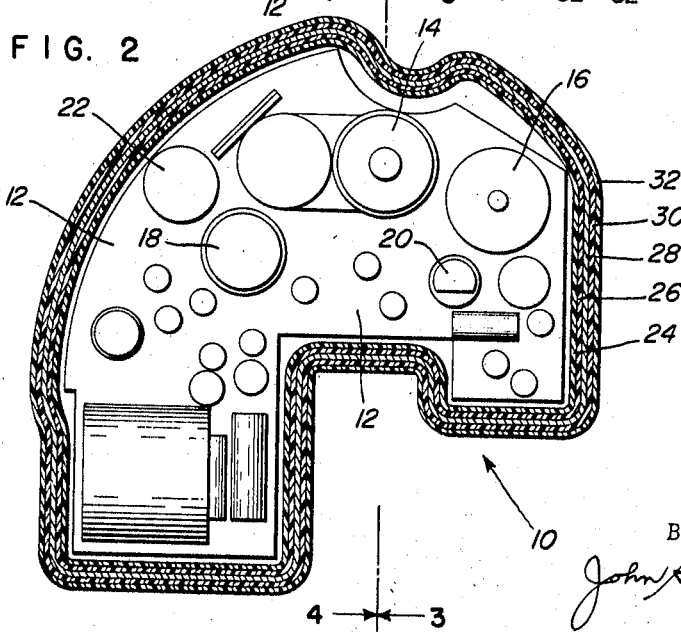

3,436,467
ELECTRIC SHIELD AND INSULATOR
Ralph S. Smith, Jr., Littleton, Colo., assignor to Honeywell Inc., Minneapolis, Minn., a corporation of Delaware
Filed Sept. 9, 1966, Ser. No. 584,032
Int. Cl. H05k 9/00; F16q 15/02; H04b 1/08
U.S. Cl. 174—35
2 Claims

ABSTRACT OF THE DISCLOSURE

This application provides an irregularly shaped electrical structure that is constructed of components which emit electromagetic and/or electrostatic fields and other components that are adversely affected by these electromagnetic and/or electrostatic fields, a first and second sheet made of cellulose acetate or cellulose propionate, a ferrous or non-ferrous conductive foil sandwiched therebetween vacuum formed with the two sheets in snug surface to surface contact about and between the components that form the irregular shaped structure to respectively provide a shield that will prevent the respective electromagnetic-electrostatic and electrostatic fields from being transmitted to components that are otherwise adversely affected by these fields.

---

It is an object of the invention to disclose a composite material that can be beneficially employed as an electrical insulator and an electromagnetic and/or electrostatic shield.

It is one of the objects of the present invention to disclose a cover to form an electrical insulator and an electrostatic and/or electromagnetic shield about components forming an electric circuit.

It is another object of the invention to disclose a covering of the aforementioned type that can be used to encapsulate the components of an electric circuit in an efficient, economical, space-saving manner.

It is another object of the present invention to disclose: 1, a covering that is comprised of a first layer of plastic material vacuum formed over electric circuit components, or over a mold shaped like these components, 2, a second layer of metal foil that is hand formed, preformed, or vacuum formed over the first layer, and the third layer of electrical insulating plastic material vacuum formed over the foil to retain the foil in place.

It is a more specific object of the invention to employ a layer of clear plastic material such as cellulose acetate or cellulose propionate as the first of the aforementioned layers of the cover, a layer of ferrous foil as the second layer, and another layer of either of the aforementioned plastic materials as the third layer.

It is another object of the present invention to disclose an alternate construction in which the outer surface of the inner plastic layer or the inner surface of the outer plastic layer contains a spray, dip, or vacuum metalized coating of aluminum or other non-ferrous foil material as an electrostatic shield or a ferrous foil as an electrostatic-electromagnetic shield.

It is also an object of the invention to disclose still another alternate construction in which the aforementioned two plastic layers and the selected foil layer are joined together by a suitable adhesive coating to form a unitary laminated composite material that can be vacuum formed about the component parts of an electric circuit.

It is still another object of the present invention to disclose a cover of the aforementioned type that is useful particularly in providing an electromagnetic and/or electrostatic shield and electrical insulator about electrical quenching circuit components that are used with photo flash guns to automatically cut-off the light being emitted by the gun when the exposure is correct as is disclosed in the Roger D. Erickson patent application, Ser. No. 393,310 filed Aug. 31, 1964, now U.S. Patent 3,350,603.

A better understanding of the present invention can be had from the following detailed description when read in connection with the accompanying drawings in which:

FIGURE 1 is an isometric view of a typical cover;
FIGURE 2 is a cross-sectional view taken along line 2—2 of FIGURE 1 showing how the cover surrounds a printed circuit plate and the electrical components that are mounted thereon;
FIGURE 3 is a cross-sectional view taken along the line 3—3 of FIGURE 2 showing how the cover is mounted to snugly encompass the printed circuit plate and the components located on the left end of this plate;
FIGURE 4 is a cross-sectional view taken along line 4—4 of FIGURE 2 showing how the cover is mounted to snugly encompass the printed circuit plate and the components located on the right end of this plate.

The cover disclosed in this application is comprised of three composite materials; namely, two electrical insulating cellulose materials which may be cellulose acetate or cellulose propionate and a third material which forms an electromagnetic and/or electrostatic shield between the first two materials.

This cover is identified in FIGURE 1 of the drawing as reference numeral 10.

FIGURES 2–4 of the drawing shows a printed circuit plate 12 and electrical components, e.g. 14–22 associated therewith encapsulated within the unique cover 10 to be hereinafter described.

This cover 10 is comprised of a first layer of the aforementioned electrical insulating material that is formed by the shell portions 24, 26 a layer of a selected foil 28, and a second layer of the aforementioned insulating material that is formed by the shell portions 30, 32.

Each of the shell shaped insulating materials 24, 26 are formed by first placing these sheets over a mold of the printed circuit plate 12 and its components 14–20, etc. or alternatively directly over the plate 12 and its components 14–20. A vacuum is then applied to these sheets to form them into two compact electrical insulating shell shaped parts 24, 26.

A die cut pattern of a selected foil 28 to suit the size of the circuit to be covered which preferably has a thickness of not less than .001 of an inch and not greater than .003 of an inch is hand pressed into close physical surface to surface contact about the insulating shell parts 24, 26.

Aluminum or another non-ferrous metal is selected for the foil 28 for electrostatic shielding or a ferrous material is selected for the foil 28 when electrostatic-electromagnetic shielding is desired.

Two sheets of insulating material 30, 32 forming second electrical insulating layers are placed over the outer surface of the selected foil 28 and a vacuum is applied to pull these insulating sheets into close compact compressing physical surface to surface engagement against the selected foil. The vacuum is removed and the over-lapping surface 34 of the two sheets 30, 32 which are now of a shell shaped configuration are sealed along their overlapping edges 36 in a fluid tight fashion with one another by heat sealing or a suitable cement.

Alternately, the two insulating layers and the selected foil shield positioned between these two layers can be made of a single one piece laminar construction by employing suitable bonderizing materials between the selected foil and its two associated insulating layers.

Instead of using the selected foil the surface between the two electrical insulating layers can be dipped, sprayed, or vacuum metalized with a liquid coating of the selected foil.

From the aforementioned description it can be seen that a compact, low cost cover in the form of a shell has been disclosed which provides efficient electrical insulating and electrostatic and/or electromagnetic protection about an electrical circuit.

What is claimed is:

1. An article of manufacture, comprising an irregularly shaped electrical structure having at least one component constructed to emit electrostatic and electromagnetic fields, said structure having at least one other component angularly displaced in spaced apart relation with said first mentioned component that is adversely effected by said fields, a first and second insulator constructed of a sheet of cellulose material and a ferrous foil sandwiched between said first and second sheets vacuum formed in snug relation between and about said components forming the irregularly shaped structure, said insulator and foil forming a substantially air-tight shell about said irregularly shaped structure to protect the operation of said other components from being adversely effected by the electrostatic and electromagnetic fields emitted by said first mentioned component and wherein the sheet of cellulose material forming the outermost surface of the shell is formed of a two piece construction.

2. An article of manufacture, comprising an irregularly shaped electrical structure having at least one component constructed to emit an electrostatic field, said structure having at least one other component angularly displaced in spaced apart relation with said first mentioned component that is adversely effected by said electrostatic field, a first and second insulator constructed of a sheet of cellulose material and a conductive non-ferrous foil sandwiched between said first and second sheet vacuum formed in snug relation between and about said components that form the irregularly shaped structure, said insulator and foil forming a substantially air-tight shell about said irregularly shaped structure to protect the operation of said other components from being adversely effected by the electrostatic field emitted by said first mentioned component.

References Cited

UNITED STATES PATENTS

| 1,944,323 | 1/1934 | Kilchling | 161—220 XR |
| 2,003,494 | 6/1935 | Reynolds | 161—220 XR |
| 2,036,709 | 4/1936 | MacLaren. | |
| 2,325,668 | 8/1943 | Dreyfus | 161—220 XR |
| 2,388,848 | 11/1945 | Howe. | |
| 2,559,794 | 7/1951 | Prichard | 161—220 XR |

FOREIGN PATENTS 295,613    8/1928    Great Britain.

OTHER REFERENCES

"Flexible Magnetic Shielding Foil Cuts Production Costs," pub. Electronic Equipment, June 1957, pp. 20 and 21.

DARRELL L. CLAY, *Primary Examiner.*

U.S. Cl. X.R.

161—220, 220; 325—357, 357